United States Patent
Leon (10) Patent No.: US 9,994,275 B1
(45) Date of Patent: Jun. 12, 2018

(54) UNIVERSAL PIPING CLAMP

(71) Applicant: Michael A. Leon, Orlando, FL (US)

(72) Inventor: Michael A. Leon, Orlando, FL (US)

( * ) Notice: Subject to any disclaimer, the term of this patent is extended or adjusted under 35 U.S.C. 154(b) by 0 days. days.

(21) Appl. No.: 15/530,387

(22) Filed: Jan. 6, 2017

(51) Int. Cl.
*A47B 96/06* (2006.01)
*B62J 99/00* (2009.01)
*A01K 27/00* (2006.01)
*F16B 2/06* (2006.01)

(52) U.S. Cl.
CPC .............. *B62J 99/00* (2013.01); *A01K 27/003* (2013.01); *A01K 27/005* (2013.01); *F16B 2/065* (2013.01); *B62J 2099/0073* (2013.01)

(58) Field of Classification Search
CPC ......... F16L 3/1016; F16L 3/10; F16L 3/1091; F16L 3/1207; F16L 3/1025; F16L 3/1033; F16L 3/1041; F16L 3/1211; F16L 3/1066; A01K 27/003; A01K 27/005; F16B 2/065; A16K 27/005; B62J 2099/0073
USPC ...... 119/769–771; 248/231.61, 228.5, 230.5, 248/229.24, 229.14, 49–74.5; 403/390, 403/351
See application file for complete search history.

(56) References Cited

U.S. PATENT DOCUMENTS

| | | | | |
|---|---|---|---|---|
| 2,353,443 | A | * 7/1944 | Carpenter | F16L 3/227 248/68.1 |
| 2,886,277 | A | * 5/1959 | Boham | E06C 7/48 182/110 |
| 6,148,772 | A | * 11/2000 | Keyek-Frannsen | A01K 1/04 119/771 |
| 2007/0007746 | A1 | * 1/2007 | Smith, Jr. | B60P 3/1066 280/414.1 |

* cited by examiner

*Primary Examiner* — Christopher Garft
(74) *Attorney, Agent, or Firm* — Harry I. Leon; Vivian L. Steadman (57) ABSTRACT

A clamp assembly mountable on a short span of structural tubing which can have any one of a broad spectrum of transverse cross-sectional shapes, sizes and vertical orientations, as found in bicycle frames and the like. Augmenting the assembly's inner and outer clamp members, so that one can use them to maintain a tight grip on the short span, is an assortment of inserts. Each insert, when deployed between the outer member's elongated flat face and the inner clamp member's midsection where it bounds a long, relatively narrow concavity, is designed to keep the clamp members from slipping sideways with respect to the compression force applied through them to the short span. Included is a two-headed insert, deployed one head at a time, as dictated by how much the short span fills said concavity and whether it extends, beyond it, perpendicularly to the elongated flat face.

5 Claims, 6 Drawing Sheets

UNIVERSAL PIPING CLAMP

CROSS REFERENCE TO RELATED APPLICATION

This application claims the benefit of U.S. Provisional Patent Application Ser. No. 62/387,812, filed on Jan. 6, 2016, the contents of which are herein incorporated by reference in their entirety.

BACKGROUND OF THE INVENTION

Structural tubes, especially those chosen because of space-related constraints or to avoid interference with a tube's neighbor because of its anticipated repositioning during use, come in a wide variety of transverse cross-sectional shapes and sizes. In the case of bicycle components such as rear wheel support braces and chain stays, for example, the list of such shapes is strikingly long: squares, rectangles, ellipses, flat-sided rounds, teardrops, and D-shaped cross-sections to which a round cable pocket is attached. And everyday more of these diverse shapes and sizes emerge, compounding the difficulty a would-be installer of a bike-mounted dog leash such as those taught by Leon in U.S. Pat. Nos. 7,013,840 and 8,544,420 faces.

The mounting structure common to the cited dog leashes features inner and outer clamp members, each of which defines an elongated, generally flat face that, in use, extends in an upright direction. The inner clamp member of this pair, which is structurally a flat plate, is kept free of any protruding arm for its full length. The outer clamp member, on the other hand, is L-shaped. It has, in addition to an upright arm with a flat face which extends substantially the full length of one of its sides, an auxiliary arm. Disposed perpendicularly to the upright arm at its base, the auxiliary arm is located on the side thereof opposite to that of the upright arm's full length flat face.

Playing a critical role in the dog leashes as taught by Leon, the auxiliary arm is not only used, in assembled relation with a flexible coupling located at one end of each such leash, to secure the latter to the bicycle, but also when the mounting structure is optimally positioned on a bicycle's frame, this auxiliary arm projects outwardly from points thereon located downwardly of the bike's rear axle. As a consequence, harsh sideways pulls by an animal tethered with the leash to the bicycle are applied to points thereon unlikely to destabilize and tip it. Unfortunately, few sites on a bike's frame are ideal for so positioning the mounting structure; and all too often, one finds that any such site, on a particular bicycle, which would otherwise be optimal from a "positioning" perspective, only affords structural tubing with a transverse cross-sectional shape, or shapes, onto which this well known mounting structure cannot be reliably clamped.

In the area of bike-mounted dog leashes alone, a need exists for a mounting structure which can be clamped onto structural tubing, regardless of its transverse cross-sectional shape, in such a way that without the mounting structure damaging the tubing's finish, any rotation of the mounting structure about the tubing is eliminated.

An improved mounting structure is also needed to address a growing demand from bicyclists for dog leashes attachable to the right side of bicycles. Heretofore, the leashes have been predominantly attached to the left side of bicycles as shown in U.S. Pat. No. 7,013,840. Such an approach, primarily designed to meet the needs of off road users, has enabled installers of Leon's bike-mounted dog leashes to avoid certain space-related constraints imposed by the chain, sprockets and derailleurs, as well as an increasing number of gears—all of which, if present, are generally located on the bicycle's right side. Nevertheless, when a dog tethered to a bike is run, alongside of a bicyclist, down a busy trail or public road, safety concerns dictate that the leash should be attached to the bicycle's right side so that the risk of bodily injury to either the bike rider or the tethered animal—or to the public at large—can be minimized.

Further driving the need for an improved mounting structure is the lack of clamp friendly structural tubing in many personal carriers. Wheelchairs, power chairs, adult tricycles, shopping carts for the handicapped, and Segway® personal mobility devices, for example, all lack structural tubing with which, by fixedly pressing a short span of it between the respective flat faces of a pair of inner and outer clamp members and then holding them and the short span together in assembled relation with the use of nuts and bolts or the like, one could not only flexibly couple the outer clamp member's auxiliary arm to a slack-free, bendable dog leash, as taught in U.S. Pat. No. 8,544,420, but also optimally position the leash for use with a personal carrier-tethered animal.

SUMMARY OF THE INVENTION

The object of the invention is to provide a clamp assembly which can be quickly attached, without the use of tools, to the structural tubing now found in the frames of bicycles and other personal carriers, with the clamp assembly being so attached in such a way that rotation of the clamp assembly about the tubing is virtually eliminated, even though the tubing, in its transverse cross-section, has any one of a wide variety of shapes, sizes, or orientations or some combination thereof.

A further object is to provide such a clamp assembly which can be attached to either the right or the left side of any bicycle's rear wheel support frame, without modifying it structurally, in such a manner as to reduce the tipping forces from an animal tethered thereto with the use of a leash, when one end thereof is connected to the clamp assembly, by applying these forces below the bicycle's rear axle.

In accordance with present invention, the clamp assembly comprises an improved inner clamp member in the form of a rigid, narrow, generally uniform-in-transverse width strap which defines both a pair of spaced apart, small flat plates and an elongated midsection which interconnects the flat plates and forms, with them, a single, unitary piece. Separated from the strap's distal ends by the flat plates, the midsection itself veers away from each of them and, in so doing, forms two of four bends in the strap, with each of said two bends being separated from the strap's distal end closest thereto by a flat plate's length. The locations of the strap's other two bends space them apart from each other as well as from the two midsection/flat plate bends, at the same time the strap defines two sides, in close proximity to each such location, which diverge from each other in a direction away from it, with the angle at which said two sides so diverge being in excess of 90 degrees but not necessarily being the same angle for both locations. Moreover, each of the flat plates defines a flat face oriented in generally the same direction as is the other flat plate's flat face; and all four of the strap's bends are formed in such a way that the strap's centerline which runs between the strap's distal ends extends longitudinally from one bend to the next in generally the same imaginary plane.

In the preferred embodiment, the clamp assembly also includes an L-shaped outer clamp member which has first and second arms, with the first arm defining both an elongated, flat face and a pair of openings spaced apart from each other longitudinally along the flat face's centerline. The second arm, which is affixed to the first arm at its base on a side thereof opposite to that of its elongated, flat face, extends perpendicularly thereto and in a direction away from it.

Spaced apart from each other at approximately the same distance as are the two openings in the first arm are two square-edged apertures defined by the inner clamp member's flat plates. Holding both clamp members together in assembled relation when the first arm's two openings are aligned with those in the inner clamp member's flat plates are two carriage bolts and hand tightened nuts threadedly engageable therewith. Preferably, each such bolt is sized and configured in such a way that at the same time its head is seated within one of the square-edged apertures, the bolt's shank can be inserted far enough into one of the first arm's openings that the shank protrudes outwardly therefrom and can then be threadedly engaged with one of the nuts.

With the inner and outer clamp members so held together, they can form a walled-in enclosure bounded on one side by a substantial portion of the first arm's elongated flat face and on the remainder of the enclosure's sides by the inner clamp member's midsection. Unfortunately, when the footprint of this enclosure is significantly different from that of the transverse cross-section of the short span of structural tubing identified as a potential site on which to mount the clamp assembly, sideways slippage of the clamp members with respect to the compression force applied through them to the tubing can occur. Indeed, it is likely to occur in many such cases whenever the short span is only being wedged between the first arm's elongated flat face and the inner clamp member's midsection. Moreover, this slippage can occur even when the elongated flat face and the midsection are held together, as firmly as possible, in assembled relation, with the use of carriage bolts and hand tightened nuts.

In a preferred embodiment, means for countering such sideways slippage includes a dual function insert in the form of a rigid, narrow, generally uniform-in-transverse width strap which includes spaced apart first and second bent structures and an elongated, generally flattened support bar which interconnects the bent structures and forms, with them, a single, unitary piece. During this dual function insert's use, one, and only one, of its bent structures is actually held within space located between the inner clamp member's midsection and the first arm's elongated flat face at any given time. Moreover, the depth of this space will exceed that of the aforementioned walled-in enclosure whenever the clamping assembly is mounted on a span of structural tubing whose transverse cross-section, at least in a direction perpendicular to that of the elongated flat face, does not fit within said enclosure's confines.

Means for holding this sideways slippage-impeding insert in assembled relation with the inner and outer clamp members includes one of the two carriage bolts already being used to hold them together and an aperture defined by the insert's support bar. With the support bar positioned between one of the inner clamp member's flat plates and the lower end of the outer clamp member's elongated flat face, and with the support bar's aperture in alignment with both the flat plate's square-edged aperture and the opening in the elongated flat face proximate with said lower end, the bolt's shank, rerouted from its former use, is deployed in such a way that it passes through the support bar's aperture before it reaches the outer clamp member's opening.

When the greatest distance which the short span of structural tubing on which the clamp assembly is to be mounted extends, in a direction perpendicular to the outer clamp member's elongated flat face, further than the depth of said walled walled-in enclosure, then one can expect, over the course of the clamp assembly's routine use, more play between its inner and outer clamp members than would otherwise be the case if at least one of the inner clamp member's flat plates were to be kept firmly pressed against the outer clamp member's flat face throughout said course. The sideways slippage-impeding insert, with the contact face of its first bent structure planted against a side of the short span which is oriented perpendicularly to said elongated flat face and with the distal end of the insert's bar support braced against the outer clamp member's lower end at the same time the bar support and a beveled side which connects it to the contact face are, respectively, immobilized and wedged against two sides of the inner clamp member, provides a much needed structurally sound alternative to keep such play to a minimum. Nevertheless, the insert's use, as described, is limited to those short spans of structural tubing having transverse cross-sections which extend vertically so as to only partially fill that portion of space which stretches between the midsection's two beveled sides and, as a result, leave sufficient room there for the first bent structure's contact face to be so planted.

On the other hand, when the room left there is inadequate as far as deploying the insert's first bent structure is concerned, it may be that the second bent structure's hook-free terminal end can be fitted in. Designed to serve as an adjunct wall when it is mounted, during use, between the midsection's two beveled sides, the second bent structure—itself a beveled side—effectively reduces the distance which otherwise separates said two sides, potentially providing for a tight fit between the clamp assembly and a short span of structural tubing. Sloping away from one of the flattened support bar's distal ends in a like manner to that in which one of the midsection's beveled sides slopes away from its adjoining flat plate, the second bent structure, once such a tight fit has been realized, is wedged, along a portion of its beveled side that is disposed in close proximity to its tip, against a side of the short span which faces perpendicularly to the outer clamp member's elongated flat face. At the same time, the insert's flattened support bar, juxtaposed between one of the inner clamp member's flat plates and the outer clamp member's elongated flat face, is firmly pressed between both of them with the use of one of the clamp assembly's carriage bolts. The latter's shank, together with its position within the support bar's aperture through which it extends, determines just how far the tip of the second bent structure can reach within the space between the inner clamp member's midsection and the outer clamp member's elongated lat face during the clamp assembly's use.

For those short spans of structural tubing on which one might want to mount the clamp assembly but which have a transverse cross-section that would occupy too little of the spacing between the midsection's two beveled sides for the first bent structure to be utilized with such a short span or else too much of said spacing for it to be so utilized but not enough for the second bent structure, then a pliable insert, deployed in such a way that it works together with one or the other of these bent structures, can oftentimes be used to counter sideways slippage of the clamp assembly relative to such a short span. A preferred pliable insert is one in which a wrappable, rubbery material, with a naturally slightly adhesive surface, is fabricated by spirally cutting a short segment of rubber tubing, such as that commonly used in urinary catheters and the like. Encasing the short span's transverse cross-section, the pliable insert, with each turn of its being wrapped thereabout, not only enlarges said cross-section, but also conforms, in general, to the contours along its periphery while at the same time smoothing out the latter's more angular aspects. As a consequence, a tight fit may be achievable in which the short span is pressed between the inner clamp member's midsection and the outer clamp member's elongated flat face at the same time either the first or the second bent structure's terminal end is wedged against the short span. Alternately, the pliable insert can be a shim in the form of a thin, flexible Plastic strip to which an adhesive has been affixed so as to give itself-adhesive properties.

For other short spans of structural tubing on which one might choose to mount the clamp assembly, neither the first nor the second bent structure, whether taken singularly or in combination with one or more of the pliable inserts, will work, largely because of the size of their respective transverse cross-sections. As a general rule in such cases, the span's transverse cross-section, at its greatest breadth in a direction perpendicular to that of the outer clamp member's elongated flat face, extends, in said direction, a distance well in excess of that of any surface area with which the first bent structure's contact face, across its entire length, could potentially interact; and/or the short span's transverse cross-section, when the span is clamped between the outer and inner clamp members, fills so much of the spacing between the latter's beveled sides that even the second bent structure's terminal end cannot be deployed there. Embodiments of the clamp assembly which omit the sideways slippage-impeding insert, and instead include a properly sized, short section of a small, rounded pipe tied firmly to one of the inner clamp member's beveled sides at points thereon proximate with the bend between it and the adjoining flat plate, can provide the three points of contact needed to counter slippage of the clamp assembly when it is mounted on such an oversized short span and ultimately prevent its rotation thereon.

BRIEF DESCRIPTION OF THE DRAWINGS

FIG. 12 is a side elevation view of the clamp assembly mounted on a short span of structural tubing which is rectangular in transverse cross-section, with the dimensions thereof being such that its breadth, in a direction oriented perpendicularly with respect to the outer clamp member's elongated flat face, is less than the walled-in-enclosure's depth, while the span, in a direction oriented generally parallel with the flat face, is substantially shorter than the spacing which separates the midsection's two beveled sides, and wherein a shim, wrapped around a portion of the outer clamp member's upright arm, and the sideways slippage-impeding insert, modified in that it lacks the first bent structure but is otherwise unchanged, are deployed, respectively, to reduce the spacing between said portion of the upright arm and the inner clamp member's midsection, so that the short span's two elongated sides can be wedged therebetween, and to resist movement of the clamp assembly in a direction parallel to that of these two elongated sides when they are so wedged.

FIG. 13 is a side elevation view of the clamp assembly mounted on a short span of structural tubing that is rectangular in transverse cross-section, in which two of the corner edges at the distal ends of one of the short span's elongated sides and the other one of its elongated sides are wedged between a modified inner clamp member's one bend-only midsection and the outer clamp member's elongated flat face, respectively, and wherein a shim, which is folded back on itself, is sandwiched not only between one of the two corner edges and the inner clamp member's midsection where the latter's longer beveled side presses against the short span, but also between the other corner edge and the midsection where its shorter beveled side both terminates at its juncture with one of the inner clamp member's flat plates and presses against the short span.

FIG. 14 is a side elevation view of the clamp assembly mounted on a short span of structural tubing on the underside of which is affixed a cable pocket, with both the tubing and the pocket being circular in transverse cross-section but differing markedly in their respective diameters, with the dimensions of the structural tubing, in a direction oriented perpendicularly with respect to the outer clamp member's elongated flat face, being such that its greatest breadth far exceeds the walled-in enclosure's depth, whereas the pocket's size and off-of-center position with respect to the structural tubing's underside are such that the pocket can be kept well within the two beveled sides of the inner clamp member's midsection, thus creating a gap between the pocket and the outer clamp member's elongated flat face, said gap allowing a properly sized, rounded pipe section, tied to one of the midsection's beveled sides, to be wedged between the elongated flat face and the pocket, at the same time the latter is pressed against said beveled side and the structural tubing itself is wedged between the inner and outer clamp members.

FIG. 18 is a side elevation view of the clamp assembly mounted on a short span of a teardrop-shaped structural tubing, wrapped in the flexible, rubbery material, with the teardrop being of such a size and oriented in such a way that when the span so wrapped is wedged between both the inner and outer clamp members at the same time the span's rounded end, along with the wrapping thereon, is pressed against each side of a niche formed inwardly of the first of the midsection's two spaced apart bends, a gap is created between the sides of the midsection's second bend and the teardrop's pointed end as the latter veers away from the vertical, but when this gap has been fitted with a doubly rounded insert in the form of a cable clamp or the like that is wedged between the sides of the second bend and said pointed end, the inner and outer clamp members work together with the doubly rounded insert to counter rotation of the clamp assembly on the short span—a distinct possibility if the gap were to be left insert-free.

DETAILED DESCRIPTION OF THE PREFERRED EMBODIMENTS

In the drawings, a wide variety of structural tubing, both hollow and solid core in transverse cross-section, is depicted on which one might want to mount the clamp assembly according to the present invention. Nevertheless, the would-be installer of a bicycle-mounted dog leash, for example, soon finds that factors, other than the capacity of the clamp assembly—that is, the leash's mounting structure—to maintain a tight grip on the structural tubing regardless of its transverse cross-section, must also be taken in account.

Figure 1:
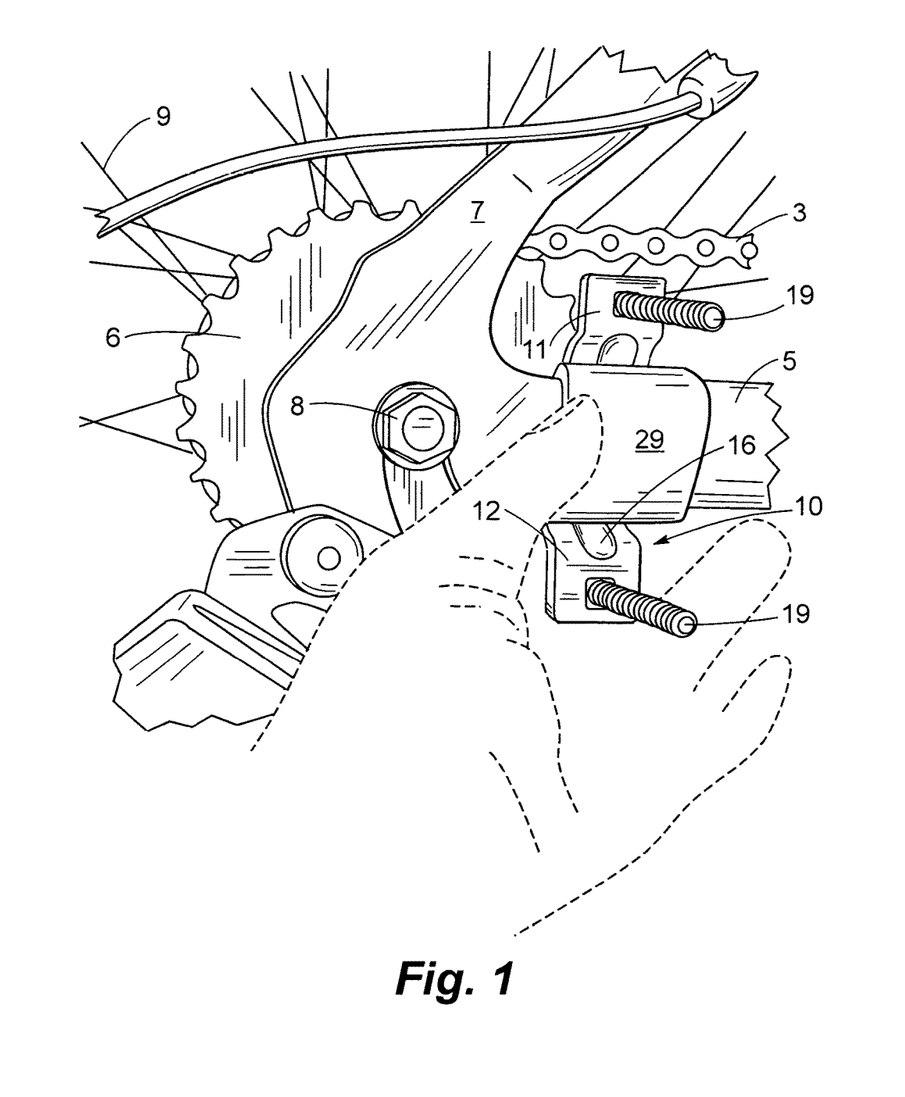
FIG. 1 is a perspective view of the inner clamp member of the clamp assembly according to the present invention and of a pair of carriage bolts mounted thereon in preparation for an outer clamp member's attachment to them—a view in which not only is the inner clamp member shown as it is being held, by an installer's hand, against a short, shim-wrapped span of a bicycle's chain stay, but also the carriage bolts are depicted as they point outwardly, with one of them atop and the other beneath said span, in a direction away from the bicycle's chain, sprocket and rear wheel support braces, all of which are pictured as fragments for ease of illustration.
Figure 2:
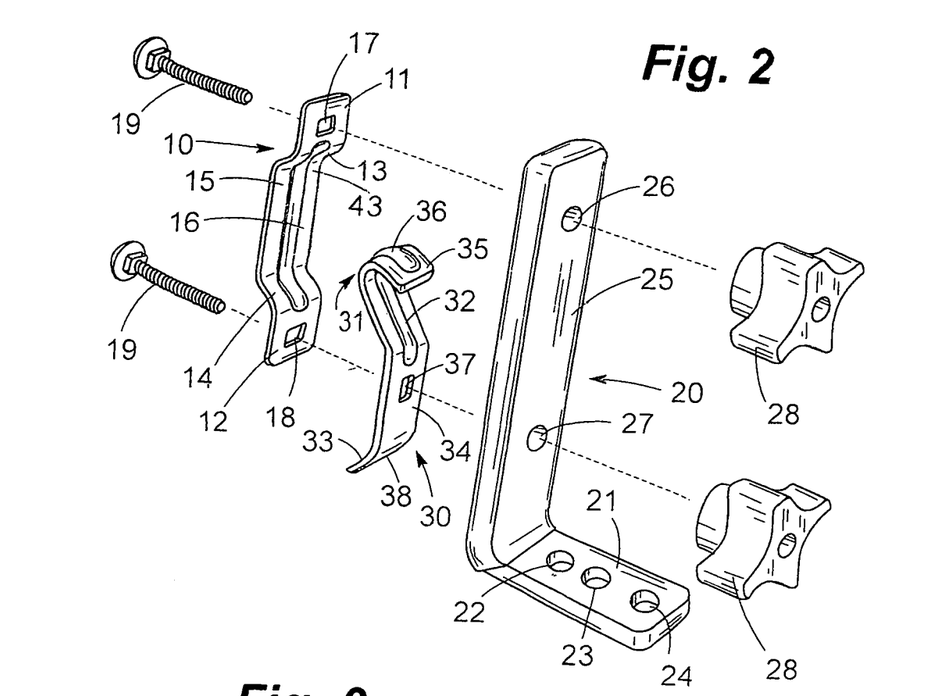
FIG. 2 is an exploded view showing, in perspective, an embodiment of the clamp assembly which includes, in addition to the inner clamp member and the pair of carriage bolts according to FIG. 1, an L-shaped outer clamp member, as well as a sideways slippage-impeding insert in which first and second bent structures, located on either side of an elongated, generally flattened support bar, form a single, unitary piece with it, with the support bar defining an aperture through which one of the carriage bolts extends when the bolts and a pair of hand tightened nuts threadedly engageable therewith are employed to hold both the insert and the inner and outer clamp members in assembled relation.

Specifically, the need for a highly compact attachment member comes to the fore, especially when one is trying to mount the clamp assembly on the right side of a bicycle's rear wheel 9 (FIG. 1). There, use of an inner clamp member 10 in the form of a rigid strap so narrow in its transverse width that the latter is only a small fraction of a person's hand width has proven itself to be a workable solution, provided the short span of the chain stay 5 on which the clamp assembly is mounted has a transverse cross-section that can be fitted into an elongated concavity 16 which is defined by the strap's midsection 15 (FIGS. 1 and 2). Not only does this highly compact configuration for the inner clamp member 10 allow it, as part of said assembly, to avoid interference with the bike's chain 3 as the latter is being shifted from one gear to the next, but also said configuration makes it possible for both the inner clamp member and the much longer, L-shaped outer clamp member 20, with its outwardly projecting arm 21, to be mounted, in assembled relation with each other, on the chain stay 5 at the same time they are being kept free of any contact with either the bike's pedal, its sprocket 6 or its derailleur and gears (not shown), even though both clamp members are arrayed in as close a proximity as practicable to the bicycle's rear axle and nut 8 which holds it in place on rear support frame 7.

Among the many possible transverse cross-sectional configurations in which structural tubing is found, by far the easiest ones on which to mount the clamp assembly's inner clamp member 10 are those like that of the short span illustrated in FIG. 1.

Figure 3:
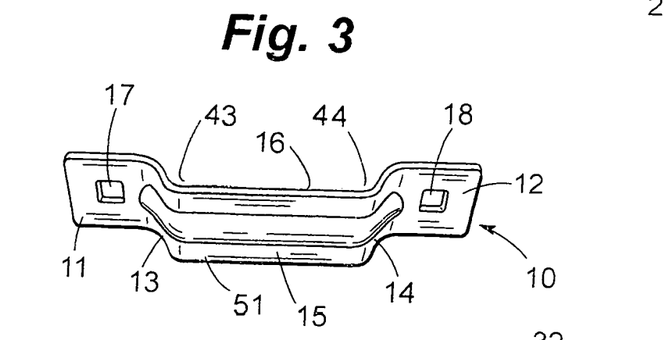
FIG. 3 is a perspective view of the inner clamp member showing a side thereof which, in assembled relation with the outer clamp member, faces in a direction away from it.
Figure 4:
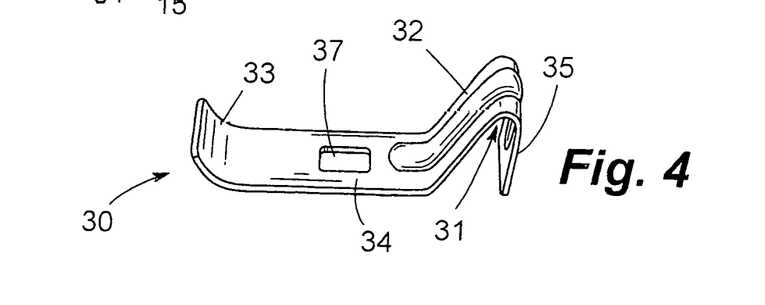
FIG. 4 is a perspective view of the sideways slippage-impeding insert showing the side of its elongated, generally flattened support bar, which during the use of the insert's first bent structure, faces towards one of the two flat plates in which the inner clamp member terminates at its distal ends, with said side of the support bar, whenever the insert's second bent structure is being used instead of the first bent structure, not only facing said flat plate, but also being pressed between it and the outer clamp member's elongated flat face.
Figures 5, 6:
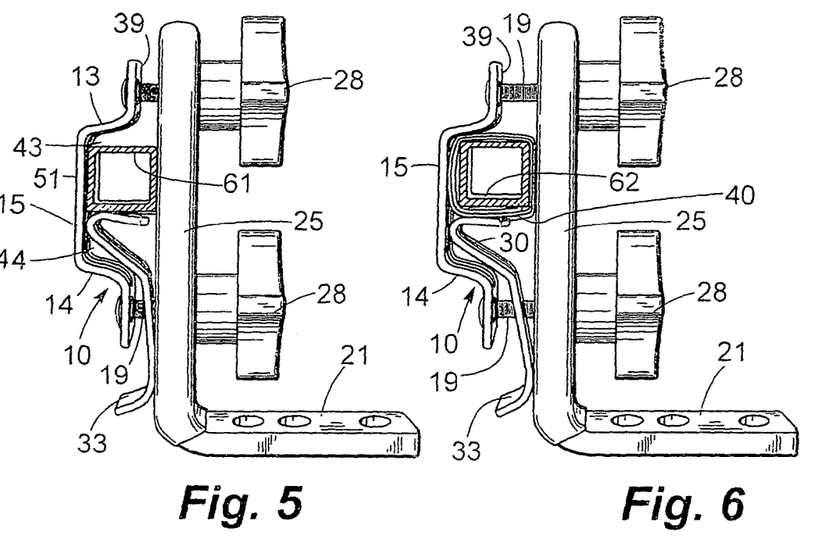
FIG. 5 is a side elevation view of the clamp assembly according to the present invention, showing the relative positions of the inner and outer clamp members and of the sideways slippage-impeding insert, both with respect to each other and to a short span of generally square-in-transverse cross-section shaped structural tubing, the latter being of such a size that two faces thereof can be wedged between the inner clamp member's shim-lined midsection and the outer clamp member's elongated flat face at the same time movement of the clamp assembly in a direction parallel to that of the span's two faces so wedged is resisted by the insert's first bent structure with its hook-like terminal end as well as by one of the midsection's bends disposed contiguous with a corner edge of the short span.
FIG. 6 is a side elevation view of the clamp assembly, showing both the inner and outer clamp members and the sideways slippage-impeding insert, as well as a transverse cross-section of a short span of four-square structural tubing that is wrapped in a flexible, rubbery material fabricated by spirally cutting rubber tubing, wherein the span thus encased is of such a size that two of the structural tubing's faces so wrapped can be wedged between the inner clamp member's shim-lined midsection and the outer clamp member's elongated flat face at the same time the structural tubing's other two faces are wedged against one of the midsection's beveled sides and the insert's hook-like terminal end.
Figures 7, 8:
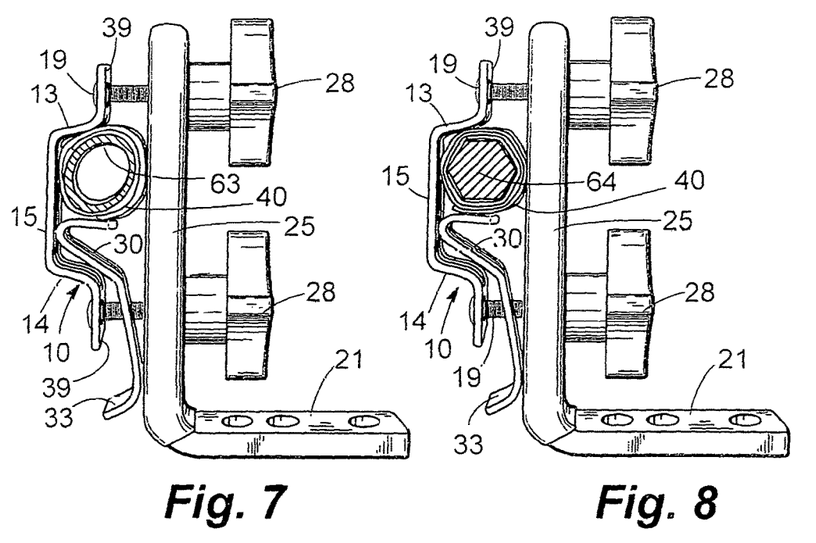
FIG. 7 is a side elevation view of the clamp assembly mounted on a short span of an oval-shaped structural tubing, which, as indicated by its transverse cross-section pictured with the clamp assembly, is wrapped in said flexible, rubbery material and is oriented in such a way that the span so wrapped can be wedged between both the inner and outer clamp members and against the sideways slippage-impeding insert, with the latter working with both of them to keep the span so wrapped firmly pressed against each side of a niche formed inwardly of one of the midsection's two spaced apart bends.
FIG. 8 is a side elevation view of the clamp assembly mounted on a short span of a six-sided, solid core structural element, which, as indicated by said element's transverse cross-section pictured with the clamp assembly, is wrapped in the flexible, rubbery material and is oriented with respect to the vertical in such a way that, were this six-sided span to be left unwrapped, the elongated flat face of the outer clamp member's upright arm could only be brought into contact with just one of the span's six edges, but wherein the span's orientation and size are such that the contact face of the insert's first bent structure can be wedged firmly against one of the six sides of the span so wrapped and thus compensate for its having only minimal contact with the outer clamp member's elongated flat face.
Figure 9:
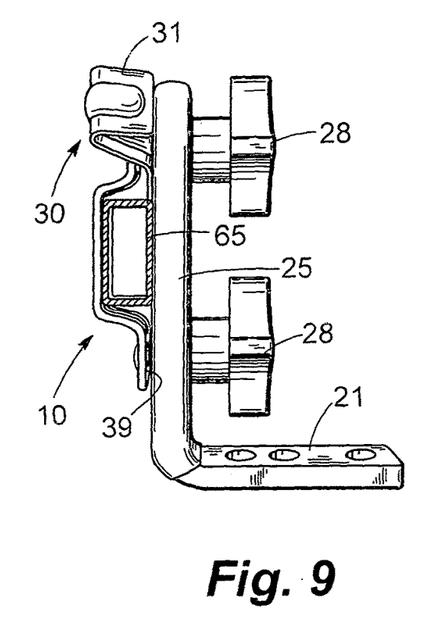
FIG. 9 is a side elevation view of the clamp assembly mounted on a short span of structural tubing which is rectangular in its transverse cross-section, with the dimensions thereof being such that it so closely matches the footprint of a walled-in enclosure bounded on one side by a substantial portion of the outer clamp member's elongated flat face and on the remainder of the enclosure's side by the inner clamp member's midsection, that both of the inner clamp member's flat plates can be firmly pressed against said elongated flat face when the short span is wedged between the inner and outer clamp members, without either the first or the second bent structure being wedged against the short span.
Figure 10:
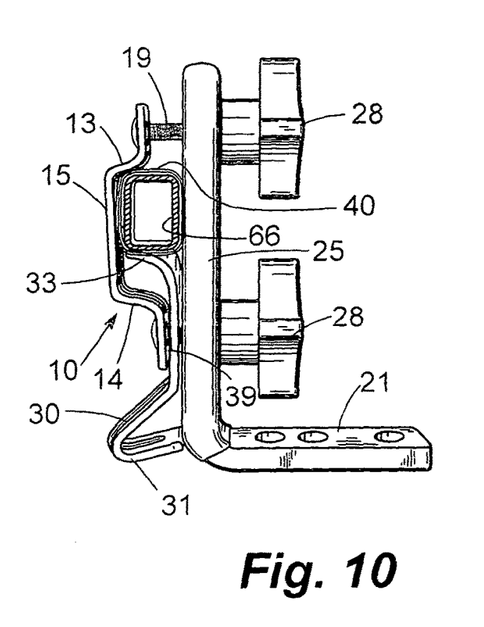
FIG. 10 is a side elevation view of the clamp assembly mounted on a short span of structural tubing which is rectangular in its transverse cross-section and wrapped in the flexible, rubbery material, with the span so wrapped having such dimensions that two of its sides can be wedged between the inner clamp member's shim-lined midsection and the outer clamp member's elongated flat face at the same time movement of the clamp assembly in a direction parallel to that of the span's two sides so wedged is resisted by the sideways slippage-impeding insert's second bent structure as well as by one of the midsection's beveled sides.
Figure 11:
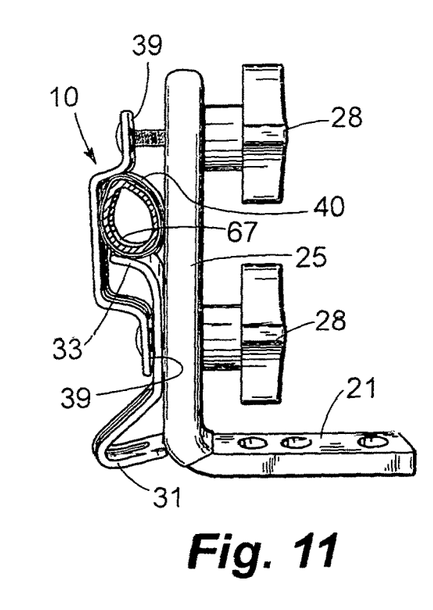
FIG. 11 is a side elevation view of the clamp assembly mounted on a short span of a teardrop-shaped structural tubing, wrapped in the flexible, rubbery material, with the teardrop's rounded end being of such a size and oriented in such a way that the span so wrapped can be wedged between both the inner and outer clamp members and against the second bent structure of the sideways slippage-impeding insert, with the latter working with said clamp members to keep the span so wrapped firmly pressed against each side of a niche formed inwardly of one of the midsection's two spaced apart bends.

Not only are the two vertically oriented sides of the bicycle chain stay 5 shown there disposed generally parallel with each other, but also their respective lengths and the distance separating these two sides are those of a short span with a transverse cross-section that fits within the confines of a walled-in enclosure. The latter is formed by the improved clamp assembly when the inner clamp member's flat plates 11, 12 are pressed against the elongated flat face of the outer clamp member's upright arm 25 (FIGS. 2, 3, 9). Indeed, in the case of the chain stay 5, the narrowness of its transverse cross-section is such that a shim 29 must be wrapped around the short span in order to give it sufficient bulk that when the clamp assembly is mounted on it, it fits tightly within said confines.

Figure 12:
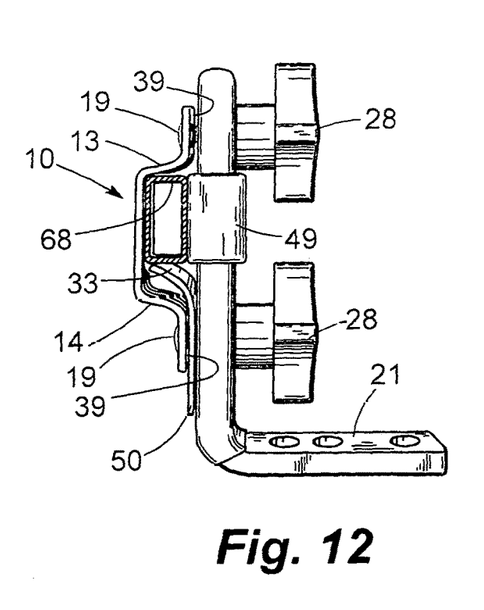
Figure 13:
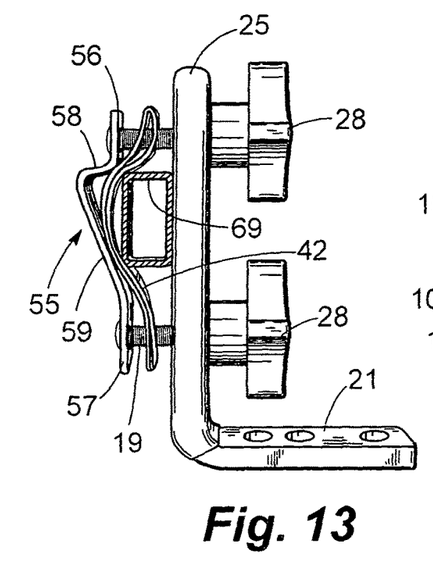
Figure 14:
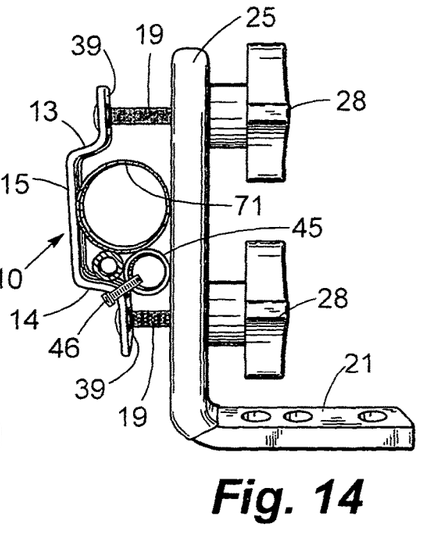
Figure 15:
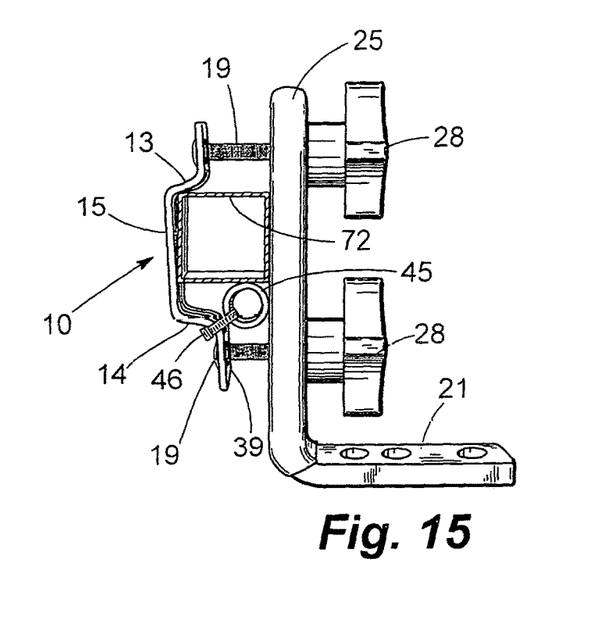
FIG. 15 is a side elevation view of the clamp assembly mounted on a short span of generally square-in-transverse cross-section shaped structural tubing, the latter being of such a size that two faces thereof can be wedged between the inner and outer clamp members at the same time movement of the clamp assembly in a direction parallel to that of the span's two faces so wedged is resisted by an insert in the form of a short, rounded pipe section tied to the inner clamp member at one of its midsection's terminal ends as well as by one of the midsection's bends disposed contiguous with a corner edge of the short span.
Figure 16:
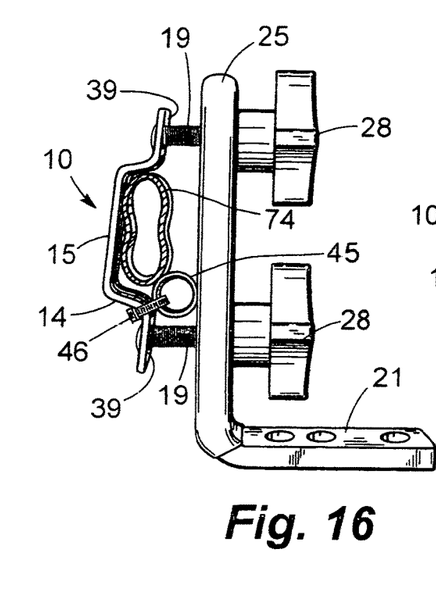
FIG. 16 is a side elevation view of the clamp assembly mounted on a short span of a generally double oval shaped structural tubing, with the double oval's longitudinally spaced apart rounded ends being of such size and shape that when one of them is pressed against each side of a niche formed inwardly of one of the two spaced apart bends of the inner clamp member's midsection, the other rounded end can be pushed away from the midsection's terminal end most distal from said niche and in a direction towards it by wedging a small, rounded pipe section between said terminal end and the outer clamp member's elongated flat face.
Figure 17:
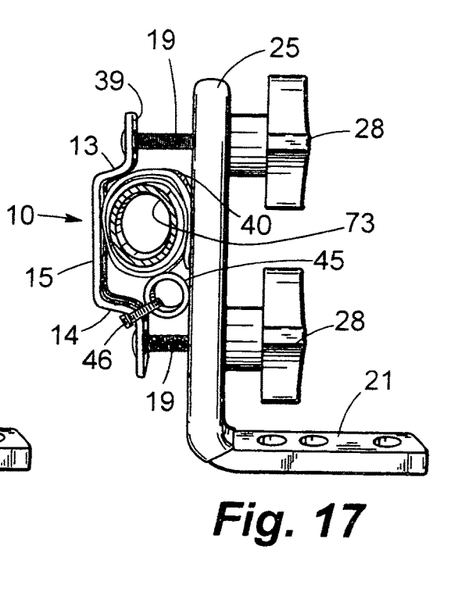
FIG. 17 is a side elevation view of the clamp assembly mounted on a short span of a generally oval shaped structural tubing, which, as indicated by its transverse cross-section, is wrapped in said flexible, rubbery material and is oriented in such a way that the span so wrapped can be wedged between both the inner and outer clamp members and pressed against a each side of a niche formed inwardly of one of the midsection's two spaced apart bends by wedging a small, rounded pipe section between the outer clamp member's elongated flat face and the more distal one of the two terminal ends of the inner clamp member's midsection, as well as against the short span itself and its wrapping.
Figure 18:
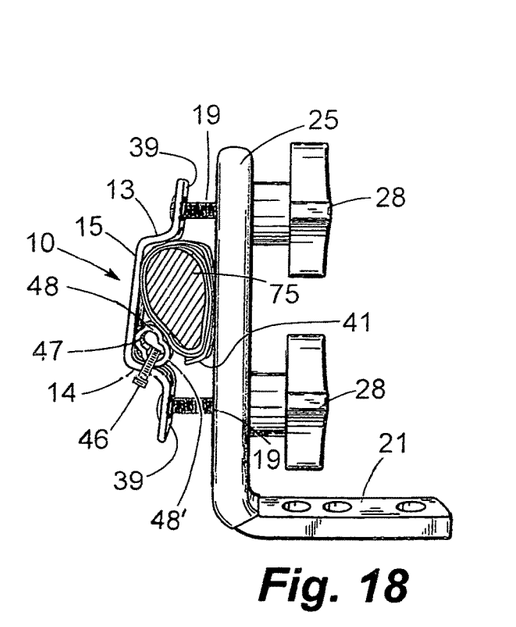

On the other hand, for a short span with a transverse cross-section which fills substantially less of the spacing between the inner clamp member's beveled sides 13, 14 than does that of the chain stay 5, it may be preferable to wrap the upright arm 25 of the outer clamp member 20 with a shim 49 instead of trying to wrap the short span (FIG. 12).

Regardless of which location is chosen to be wrapped with a shim 29, 49 or whether only a shim liner 39 is applied to the inwardly directed faces of the inner clamp member 10, each of these shims, fabricated as it is of a pliable, plastic strip to which an adhesive has been affixed so as to give it self-adhesive properties, quickly conforms to the various shapes of any rigid objects between which it is pressed during use.

Moreover, said shims/shim liner are not the only inserts—pliable or otherwise—which so conform with use. Indeed, even the inner and outer clamp members 10, 20 conform, over time, to the shape of the short span on which the clamp assembly is mounted. As a consequence, a person who uses it to tether an animal to a bicycle or other personal carrier needs to make certain before each ride that he has tightened as much as possible and with the use of both hands, both of the knobs 28. They, together with the carriage bolts 19, each of which is individually received within one of the flat plates' square-shaped apertures 17, 18 at the same time its shank is projected outwardly through the upright arm's holes 26, 27, respectively, hold the inner and outer clamp members 10, 20 in assembled relation (FIG. 2). Importantly, the more rounded the short span is, the tighter one must keep the knobs 28.

The invention claimed is:

1. A clamp assembly mountable on a short span of structural tubing, which comprises:
    inner and outer clamp members to grip the clamp assembly onto the short span;
    wherein the inner clamp member, in the form of a rigid, narrow, generally uniform-in-transverse width strap, defines both a pair of spaced apart, small flat plates and an elongated midsection joined at its distal ends thereto, the midsection including at least one beveled side and an elongated, generally flattened side which diverges therefrom as it forms a non-angular bend with said beveled side; with the bend and the midsection defining a non-angular niche and an elongated concavity, respectively, in which the niche, located at one end thereof, is bounded by both the flattened side and the beveled side; wherein the elongated concavity extends longitudinally along the midsection between the midsection's distal ends; and wherein the elongated concavity is oriented perpendicularly with respect to the short span's longitudinal centerline when the clamp assembly is so gripped onto the short span;
    wherein the midsection interconnects the spaced apart, small flat plates, each of which defines a short flat face oriented in generally the same direction as is the other flat plate's short flat face;
    wherein the outer clamp member includes a plate-like arm which defines an elongated flat face;
    means, including bolts and nuts threadedly engageable therewith, for holding the inner and outer clamp members together in assembled relation; and
    means for wedging an integral part of the short span within said non-angular niche when the short span can take up only so much space within the elongated concavity that a sizeable portion thereof is left free of the short span, with the wedging means occupying at least some of said sizeable portion of space within the concavity at the same time the short span, juxtaposed between the midsection and the elongated flat face, is held in place there with at least one of the inner clamp member's flat plates spaced apart from the elongated flat face, so that sideways slippage of the inner and outer clamp members with respect to the short span of structural tubing can be prevented.

2. A clamp assembly mountable on a short span of structural tubing, which comprises:

an inner clamp member in the form of a rigid, generally uniform-in-transverse width strap which defines both a pair of spaced apart, small flat plates and an elongated midsection joined at its distal ends thereto and bent, with respect to the strap's longitudinal centerline, in two locations which are spaced apart from each other as well as from said flat plates, with the midsection so twice bent defining an elongated generally flattened cross bar and two spaced apart, beveled sides adjoining the cross bar's distal ends, with the two beveled sides diverging from each other in a direction away from the cross bar; wherein the midsection bounds an elongated concavity which extends longitudinally between the two beveled sides; and wherein the midsection interconnects the spaced apart, small flat plates, forming a first single, unitary piece therewith in which each of the flat plates defines a short flat face oriented in generally the same direction as is the other flat plate's short flat face;

an outer clamp member in which a plate-like arm defines an elongated flat face;

means, including bolts and nuts threadedly engageable therewith, for bringing both of the inner and outer clamp members together in such a way that the inner and outer clamp members can grip the clamp assembly onto the short span of structural tubing at the same time said short span occupies space, including at least a substantial portion thereof within said concavity, between the inner clamp member's midsection and the outer clamp member's elongated flat face; and a dual function insert in the form of a rigid, generally uniform-in-transverse width strap which includes spaced apart first and second bent structures and an elongated, generally flattened support bar which interconnects the first and second bent structures and forms, with them, a second single, unitary piece; and wherein during use, the support bar is positioned between one of the inner clamp member's flat plates and the outer clamp member's elongated flat face in such a way that just one of the first and second bent structures can be held within said space located between the inner clamp member's midsection and the outer clamp member's elongated flat face at any given time.

3. A clamp assembly mountable on a short span of structural tubing, which comprises:

inner and outer clamp members to grip the clamp assembly onto the short span;

wherein the inner clamp member, in the form of a rigid, narrow, generally uniform-in-transverse width strap, defines both a pair of spaced apart, small flat plates and an elongated midsection joined at its distal ends thereto and bent, with respect to the strap's longitudinal centerline, in two locations which are spaced apart from each other as well as from said flat plates, with the midsection so twice bent including an elongated, generally flattened cross bar and first and second spaced apart, beveled sides adjoining the cross bar's distal ends, with the first and second beveled sides diverging from each other in a direction away from the cross bar; wherein the cross bar forms a non-angular bend with the first beveled side, with the bend and the midsection defining a non-angular niche and an elongated concavity, respectively, in which the niche, located at one end thereof, is bounded by said flattened cross bar and the first beveled side; wherein the elongated concavity extends longitudinally along the midsection between the midsection's distal ends; and wherein the elongated concavity is oriented perpendicularly with respect to the short span's longitudinal centerline when the clamp assembly is so gripped onto the short span;

wherein the midsection interconnects the spaced apart, small flat plates, each of which defines a short flat face oriented in generally the same direction as is the other flat plate's short flat face;

wherein the outer clamp member includes a plate-like arm which defines an elongated flat face;

means, including bolts and nuts threadedly engageable therewith, for holding the inner and outer clamp members together in assembled relation; and means for wedging an integral part of the short span within said non-angular niche when the short span can take up only so much space within the elongated concavity that a sizeable portion thereof is left free of the short span, with the wedging means occupying at least some of said sizeable portion of space within the concavity at the same time the short span, juxtaposed between the midsection and the elongated flat face, is held in place there, so that sideways slippage of the inner and outer clamp members with respect to the short span of structural tubing can be prevented.

4. The clamp assembly according to claim 3, wherein the wedging means includes a small, rounded pipe section and a tie which connects the pipe section to the second beveled side at points thereon located in close proximity to one of the two spaced apart, small flat plates, with the pipe section so connected being held crosswise of the strap's longitudinal centerline; wherein the pipe section has a cylindrical side wall of such an outer diameter that the pipe section, when so connected, can simultaneously abut the short span and the outer clamp member's elongated flat face at the same time the inner clamp member's second beveled side abuts the pipe section and interfaces with the cylindrical side wall at points located thereon which are separated from the elongated flat face by less than the length of said outer diameter; and wherein the location of said points so separated is one in which the cylindrical side wall, during use, supports the inner clamp member in a position in which the small flat plates at its distal ends are moved away from a generally parallel alignment with the outer clamp member's elongated flat face.

5. The clamp assembly according to claim 3, wherein the wedging means includes a tie and a small, rigid, double round which has conjoined, generally cylindrically shaped side walls; wherein the tie connects the double round to the second beveled side at points thereon located midway between the flattened cross bar and one of the two spaced apart, small flat plates, with the double round so connected being held in a brace-like position between the second beveled side and the flattened cross bar; wherein the double round is dimensioned to simultaneously abut the flattened cross bar and the second beveled side at the same time the double round wedges said part of the short span within the non-angular niche and, in so abutting and wedging, occupy a substantial gap otherwise present whenever the short span's periphery in closest proximity to the second beveled side veers away from the second beveled side in the direction of the outer clamp member's elongated flat face.

* * * * *